ANDREWS & GODFREY.
Seed Separator.
No. 92,559.                                Patented July 13, 1869.
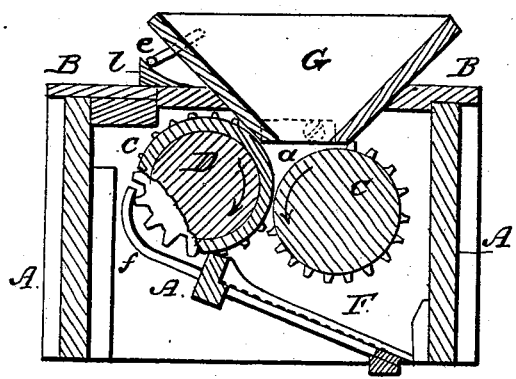
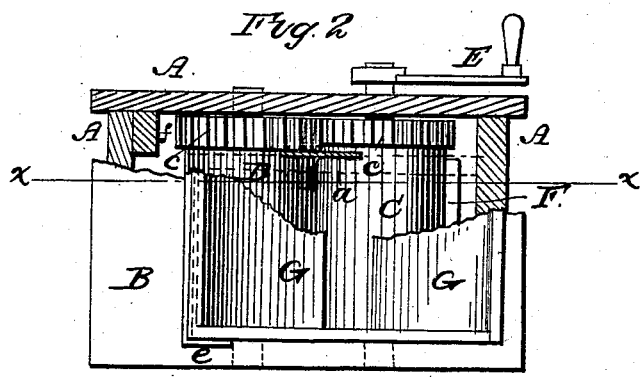

United States Patent Office.

S. W. ANDREWS AND L. GODFREY, OF GREENEVILLE, TENNESSEE.

Letters Patent No. 92,559, dated July 13, 1869.

---

IMPROVEMENT IN COCKLE-SEPARATOR.

---

The Schedule referred to in these Letters Patent and making part of the same.

---

*To all whom it may concern:*

Be it known that we, S. W. ANDREWS and L. GODFREY, both of Greeneville, Greene county, Tennessee, have invented a new and useful Improvement in Cockle-Separators; and we do hereby declare that the following is a full and exact description thereof, reference being had to the accompanying drawings, forming part thereof, and in which—

Figure 1 is a vertical section through line $x$ $x$ of fig. 2.

Figure 2 is a top view, a portion of the cover and hopper having been broken away.

In this invention, the impure wheat is fed through an adjustable hopper, so as to fall between a gum roller and a hard roller.

The two rollers being put in motion, the cockle and wheat are pressed between them, and the cockle is thereby caused to adhere to the gum roller, and to be carried around and dropped into a receptacle prepared for it, while the pure wheat falls directly from the rollers, upon a screen, which separates the small kernels from the large.

In the drawings—

A represents the walls, and

B, the top of the case or frame.

C is a roller, of wood, metal, or other hard substance.

Alongside of it, and slightly above it, is another roller, D, covered with or entirely composed of, rubber, gutta-percha, or other soft material, the two being arranged as shown, and being connected by cog-gearing $c$ $c$, by which the motion imparted to the roller C by a crank, E, is communicated to the other roller D.

F is a wire screen, or sieve, arranged under the rollers, as shown in fig. 1, and to which a rapid vibratory motion is imparted, by means of a bent arm, $f$, the end of which comes in contact with the cog-rim $c$, as shown in the drawings.

G is a hopper, arranged over the hard roller, as shown, and the feed of which is adjustable by means of a hinged rod, or bail, $e$, and an incline, I, the space between the lower front edge of the hopper and the surface of the roller being enlarged or diminished, in proportion as the bail is made to assume a more or less vertical position.

A slide bottom, or any other common device for regulating the feed, may be employed instead of this, if preferred.

A screen or partition may be employed, if necessary, to separate the cog-rim $c$ from the wheat, and prevent the latter from working among the cogs and getting crushed or interfering with the action of the machine.

Such partition may extend entirely around both rollers, or may simply consist of a triangular plate inserted between them, as shown at $a$.

The operation of this machine is as follows:

The edge of the hopper is adjusted above the roller far enough to admit wheat of the largest size to pass. The rollers are then put in motion in the direction indicated by the arrows in fig. 1, which carries the impure grain through between them.

The pressure of the hard roller against the soft one causes the barbed and rough cockle to adhere to the latter, and be carried round by it, so as not to fall on the sieve F, and a scraper may be arranged at the extreme rear edge of the soft roller, to scrape off the cockle at that point, and allow it to drop upon an incline which will carry it away or into a suitable receptacle.

The smooth, plump kernels of good wheat, as soon as they pass between the rollers, drop, by their own gravity, upon the screen.

The soft, smooth roller is arranged slightly above the other, in order that the kernels of wheat, in falling, may not detach the cockle from the soft roller.

The hopper G may have a vibratory or tremulous motion imparted to it by any suitable means, to insure the proper feed of the grain to the rollers, if it be thought that the jar caused by the working of the machine is not sufficient for that purpose. And any other suitable means may be employed, instead of the device shown, for communicating a vibratory motion to the sieve F.

The advantages claimed for this machine above all others are, that it will thoroughly separate the grain from the cockle, without regard to the fineness of either, a thing which can not be effected by screening, for the reason that the kernels of coarse cockle are larger than those of small wheat; nor by fanning, for the reason that the specific gravity of the wheat and of the cockle is too nearly equal; nor by the employment of a fuzzy surface, because the cockle is liable to fall off from such a surface, while the light wheat, which is somewhat fuzzy at the end of the kernel, is liable to adhere thereto, rendering the separation incomplete.

Besides these advantages, the machine is exceedingly simple, light, cheap, and durable.

Having thus described our invention,

What we claim as new, and desire to secure by Letters Patent, is—

1. The arrangement of the incline I, hinged bail $e$, hopper G, and rollers C D, for the purpose of rendering the "feed" adjustable, substantially as described.

2. The arrangement and combination of the rollers C D, cog-rim $c$, screen F, and arm $f$, substantially as and for the purpose specified.

S. W. ANDREWS.
L. GODFREY.

Witnesses:
JOHN N. STEVENS,
J. A. GALBRAITH.